(12) United States Patent
Grimaud

(10) Patent No.: US 10,354,437 B2
(45) Date of Patent: Jul. 16, 2019

(54) 3D EXPERIENCE WITH VIRTUAL GEMSTONES FOR ONLINE CUSTOMER

(71) Applicant: Dassault Systemes, Velizy Villacoublay (FR)

(72) Inventor: Jean-Jacques Grimaud, Winchester, MA (US)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 14/833,790

(22) Filed: Aug. 24, 2015

(65) Prior Publication Data
US 2017/0061679 A1    Mar. 2, 2017

(51) Int. Cl.
*G06T 15/50* (2011.01)
*G06T 15/06* (2011.01)
(Continued)

(52) U.S. Cl.
CPC ............ *G06T 15/50* (2013.01); *G06K 9/4652* (2013.01); *G06K 9/4661* (2013.01); *G06T 7/90* (2017.01);
(Continued)

(58) Field of Classification Search
CPC ....... G06T 15/506; G06T 15/50; G06T 15/80; G06T 15/60; G06T 15/06
See application file for complete search history.

(56) References Cited

U.S. PATENT DOCUMENTS 5,763,887 A * 6/1998 Murphy ................ G01T 1/1642
250/366
5,966,673 A * 10/1999 Shannon, Sr. ......... G01N 21/87
356/30
(Continued)

FOREIGN PATENT DOCUMENTS

WO    WO 2009/068354    6/2009

OTHER PUBLICATIONS

Vladimir Smutny ; "Light Propagation in Transparent Polyhedra.", PhD Thesis CTU-CMP-2014-11, Aug. 2014, "Center for Machine Perception, Department of Cybernetics Faculty of Electrical Engineering, Czech Technical University in Prague."; PhD Thesis CTU-CMP-2014-11; p. 103).*

(Continued)

*Primary Examiner* — Abderrahim Merouan
(74) *Attorney, Agent, or Firm* — Hamilton, Brook, Smith & Reynolds, P.C.

(57) ABSTRACT

Current real-time rendering techniques of virtual representations of jewelry with gemstones do not address the shimmer and sparkle of real gemstones. Embodiments of the present invention use real-time rendering methods and systems that enable flash scintillation and fiery scintillation on the facets of virtual representations of gemstones as they are manipulated online by the customer. A 3D representation of a gemstone is displayed. In response to user input corresponding to the manipulation of the displayed 3D representation of the gemstone, scintillations at facets of the 3D representation of the gemstone are determined. The scintil- (Continued)

lations are determined by loading a scintillation factor from a look-up table corresponding to an angle of incidence of a light source to a facet of the gemstone. The determined scintillations at the facets of the gemstone are displayed for the user in real-time.

24 Claims, 10 Drawing Sheets
(1 of 10 Drawing Sheet(s) Filed in Color)

(51) Int. Cl.
*G06T 19/00* (2011.01)
*G06K 9/46* (2006.01)
*G06T 7/90* (2017.01)

(52) U.S. Cl.
CPC .............. *G06T 15/06* (2013.01); *G06T 19/00* (2013.01); *G06T 2200/04* (2013.01)

(56) References Cited

U.S. PATENT DOCUMENTS

| | | | | |
|---|---|---|---|---|
| 6,015,974 A * | 1/2000 | Genna | G01T 1/1642 | 250/366 |
| 7,136,154 B2 * | 11/2006 | Bray | A44C 17/00 | 356/30 |
| 7,193,694 B2 * | 3/2007 | Underwood | G01N 21/87 | 356/30 |
| 7,251,619 B2 * | 7/2007 | Holloway | G06Q 30/0613 | 356/30 |
| 7,751,034 B2 * | 7/2010 | Sasian | G02B 27/0012 | 356/30 |
| RE44,963 E * | 6/2014 | Shannon, Sr. | G01N 21/87 | 356/30 |
| 2002/0043078 A1 * | 4/2002 | Kawabuchi | A44C 17/001 | 63/32 |
| 2003/0112422 A1 * | 6/2003 | Lapa | G01N 21/87 | 356/30 |
| 2003/0137506 A1 * | 7/2003 | Efran | G06T 9/00 | 345/419 |
| 2004/0051861 A1 * | 3/2004 | Bray | A44C 17/00 | 356/30 |
| 2004/0072137 A1 * | 4/2004 | Lapa | G09B 5/02 | 434/386 |
| 2005/0190356 A1 * | 9/2005 | Sasian | G01N 21/8806 | 356/30 |
| 2005/0200834 A1 * | 9/2005 | Sasian | G01N 21/87 | 356/30 |
| 2005/0261989 A1 * | 11/2005 | Vadon | G06Q 30/00 | 705/26.63 |
| 2005/0274144 A1 * | 12/2005 | Goughnour | A44C 17/003 | 63/32 |
| 2006/0164623 A1 * | 7/2006 | Wagner | G01N 21/87 | 356/30 |
| 2006/0190292 A1 * | 8/2006 | Reinitz | G01N 21/87 | 356/30 |
| 2006/0232764 A1 * | 10/2006 | Altman | G01N 33/381 | 356/30 |
| 2007/0132983 A1 * | 6/2007 | Van de Velde | G01N 21/87 | 356/30 |
| 2009/0234754 A1 * | 9/2009 | Lapa | G06Q 30/0278 | 705/26.1 |
| 2009/0236533 A1 * | 9/2009 | Ramsden | G01T 1/2002 | 250/370.11 |
| 2009/0242775 A1 * | 10/2009 | Beekman | G01T 1/1611 | 250/363.04 |
| 2009/0289190 A1 * | 11/2009 | Laine | G01T 1/20 | 250/370.11 |
| 2010/0010752 A1 * | 1/2010 | Blodgett | A44C 17/001 | 702/35 |
| 2010/0086179 A1 * | 4/2010 | Verboven | G06T 7/0004 | 382/108 |
| 2010/0088348 A1 * | 4/2010 | Verboven | G01N 21/87 | 707/802 |
| 2010/0250201 A1 * | 9/2010 | Sivovolenko | G01N 21/87 | 703/1 |
| 2010/0305924 A1 * | 12/2010 | Gelman | G06T 15/50 | 703/6 |
| 2013/0016210 A1 * | 1/2013 | Smith | G01N 21/55 | 348/135 |
| 2013/0299707 A1 * | 11/2013 | Levin | G01T 1/164 | 250/363.03 |
| 2014/0033765 A1 * | 2/2014 | Holloway | A44C 17/001 | 63/32 |
| 2014/0067331 A1 * | 3/2014 | Benjano | A44C 27/00 | 703/1 |
| 2014/0097354 A1 * | 4/2014 | Quick | G01N 21/87 | 250/453.11 |
| 2014/0214871 A1 * | 7/2014 | Adams | G06F 17/30011 | 707/758 |
| 2015/0234900 A1 * | 8/2015 | Adams | G06F 17/30528 | 707/756 |
| 2015/0289937 A1 * | 10/2015 | Chia | A61B 18/26 | 606/2.5 |

OTHER PUBLICATIONS http://www.all-color-gem-stones.com/cuts-of-gem-stones.html, All-Color-Gem-Stones.com, "Cuts of Gem Stones & Gem Stone Shapes-The Art of Gem Stone cuts, Gemstone cutting", retrieved from the Internet Aug. 12, 2015.
http://www.ascotdiamonds.com/blog/index.php/understanding-the-diamond-engagement-ring-appraisal-process, Ascot Diamonds, "Understanding The Diamond Engagement Ring Appraisal Process", retrieved from the Internet Aug. 12, 2015.
http://www.mediacollege.com/lighting/colour/colour-temperature.html, mediacollege.com, "Colour Temperature Chart," retrieved from the Internet Aug. 12, 2015.
http://blog.longsjewelers.com/engagement/diamond-cut-angles, "What You Should Know About a Diamond's Cut and Angles?" retrieved from the Internet Aug. 12, 2015.
Sasian et al., "Evaluation of brilliance, fire and scintillation in round brilliant gemstones", Optical Engineering, vol. 46(9) (Sep. 2007).
EP Search Report of EP 16 18 2469 dated Nov. 25, 2016 entitled "3D Experience With Virtual Gemstones for Online Customer".
Smutny, V., "Light Propagation in Transparent Polyhedra" Center for Machine Perception CZECH Technical University in Prague, Aug. 2014.
Sergey, S., "OctoNus Projects: Computer Modeling of Gemstones for Improvement of their Color Appearance", retrieved from Internet Nov. 25, 2016. https://web.archive.org/web/20080228022947/http://www.octonus.com/oct/projects/modeling/phtml.

* cited by examiner

3D EXPERIENCE WITH VIRTUAL GEMSTONES FOR ONLINE CUSTOMER

BACKGROUND

The customer experience of shopping online for gemstones can lack many of the real-world experiences of shopping for gemstones in a store. For example, in a store, gemstones sparkle and scintillate under ceiling spotlights as the customer handles and manipulates them. In contrast, some online representations of gemstones are created from still pictures and, while rotatable, look lifeless.

SUMMARY

Current real-time rendering techniques of jewelry with gemstones for a display do not address the shimmer and sparkle of real gemstones. For example, one technique employs virtual representations of pieces of jewelry based on computer-generated images. In some cases, the viewer is presented with a video of the jewelry piece on a rotating table. Moreover, existing rendering systems typically render loose gemstones and not gemstones mounted on a piece of jewelry. Further, the generated images of current techniques do not show the quality of the loose gemstones because the images lack scintillation and therefore, look flat. To show scintillation, existing rendering systems require the images to be processed through a large number of complex and onerous steps, making them inefficient as an interactive, real-time solution.

Some techniques manipulate gemstones in real-time but employ environment mapping. Such techniques employing environment mapping showing images of the gemstones render reflections of the gemstones' surrounding environment. While environment mapping creates some movement on the gemstone, the real-time rendering of these techniques does not address changing shimmering, sparkle and scintillation of the gemstones being manipulated.

The lack of real-time rendering solutions is an obstacle to the online purchase of jewelry with gemstones because the customer experience of manipulating the jewelry online is limited compared to that of handling jewelry in a store. An embodiment of the present invention solves the problems faced by existing real-time rendering techniques by employing real-time rendering methods and systems that enable flash scintillation and fiery scintillation on the facets of the virtual representations of gemstone(s) as they are manipulated online by a customer. The features of the present invention improve the customer experience of shopping online for a piece of jewelry, provide online retailers with a higher conversion rate of customers from visitors to buyers and facilitate retailers' upselling of gemstones. The present invention also achieves benefits over existing systems by, in real-time, interactively rendering the virtual representation of the jewelry to approximate or simulate how a real piece of jewelry would behave as if it were manipulated in a store.

In an embodiment of the present invention, a computer-implemented method renders a real-time view of a reflective and refractive (RAR) object in response to user input from a user. The method further manipulates a 3D representation of the RAR. The method further determines a scintillation at facets of the 3D representation of the RAR by loading a scintillation factor, from a look-up table stored in memory, corresponding to an angle of incidence of a light source to a facet of the RAR object and the method further displays, to a user via a display, the 3D representation of the RAR object having been user manipulated and the determined scintillation at the facets of the RAR object.

In an embodiment, determining the scintillation factor may include dividing each facet of the 3D representation of the RAR object into virtual facets. The determination the scintillation factor may include determining the fiery scintillation or the flash scintillation. The determined scintillation factor may be a flash scintillation if the RAR object is colored. The determination of the scintillation factor may be based on a position and properties of a light source. The position of the light source may be above the user. The determination of the scintillation factor may be based on look-up tables for a RAR object. The 3D representation may include a plurality of RAR objects. The determination of the look-up table corresponding to the scintillation factor may be based on dispersion, cut angle of the facet, lighting or refractive index. The displaying of the 3D representation of the RAR object having been user manipulated may include displaying a change in the intensity of the white light on a facet of the RAR object. The displaying of the 3D representation of the RAR object having been user manipulated may also include displaying a change in the coloration of the light on a facet of the RAR object. The RAR object may be a gemstone.

In an embodiment of the present invention, a system renders a real-time view of a reflective and refractive (RAR) object and comprises processors configured to manipulate and display a 3D representation of the RAR in response to user input from a user by determining a scintillation at a plurality of facets of the 3D representation of the RAR by loading the scintillation factor, from a look-up table stored in memory, corresponding to an angle of incidence of a light source to at least one facet of the RAR object. The system is further configured to display, to a user via a display, the 3D representation of the RAR object having been user manipulated and the determined scintillation at the facets of the RAR object.

In an embodiment, determining the scintillation factor includes dividing each facet of the 3D representation of the RAR object into multiple virtual facets.

In another embodiment, determining the scintillation factor includes determining the fiery scintillation and/or the flash scintillation.

In an embodiment, the scintillation factor may be a flash scintillation if the RAR object is colored.

In an embodiment, determining the scintillation factor is based on a position and properties of a light source.

In an embodiment, the position of the light source may be above the user.

In another embodiment, determining the scintillation factor is based on look-up tables for a RAR object.

In an embodiment, the 3D representation includes a plurality of RAR objects.

In an embodiment, determining the look-up table corresponding to the scintillation factor is based on dispersion, cut angle of the facet, lighting or a refractive index.

In an embodiment, displaying the 3D representation of the RAR object having been user manipulated includes displaying a change in the intensity of the white light on the facet of the RAR object.

In an embodiment, displaying the 3D representation of the RAR object having been user manipulated includes displaying a change in the coloration of the light on the facet of the RAR object.

In an embodiment, the RAR object may be a gemstone.

In an embodiment, on a brilliant RAR gemstone, such as a diamond, a hue from a color of the prism appears to the observer on some of the virtual facets as the user manipulates the gemstone. The corresponding effect of this hue may be determined and displayed on a virtual representation of the gemstone. The hue can be determined by looking up a hue for a given angle of a look-up table for the given gemstone.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
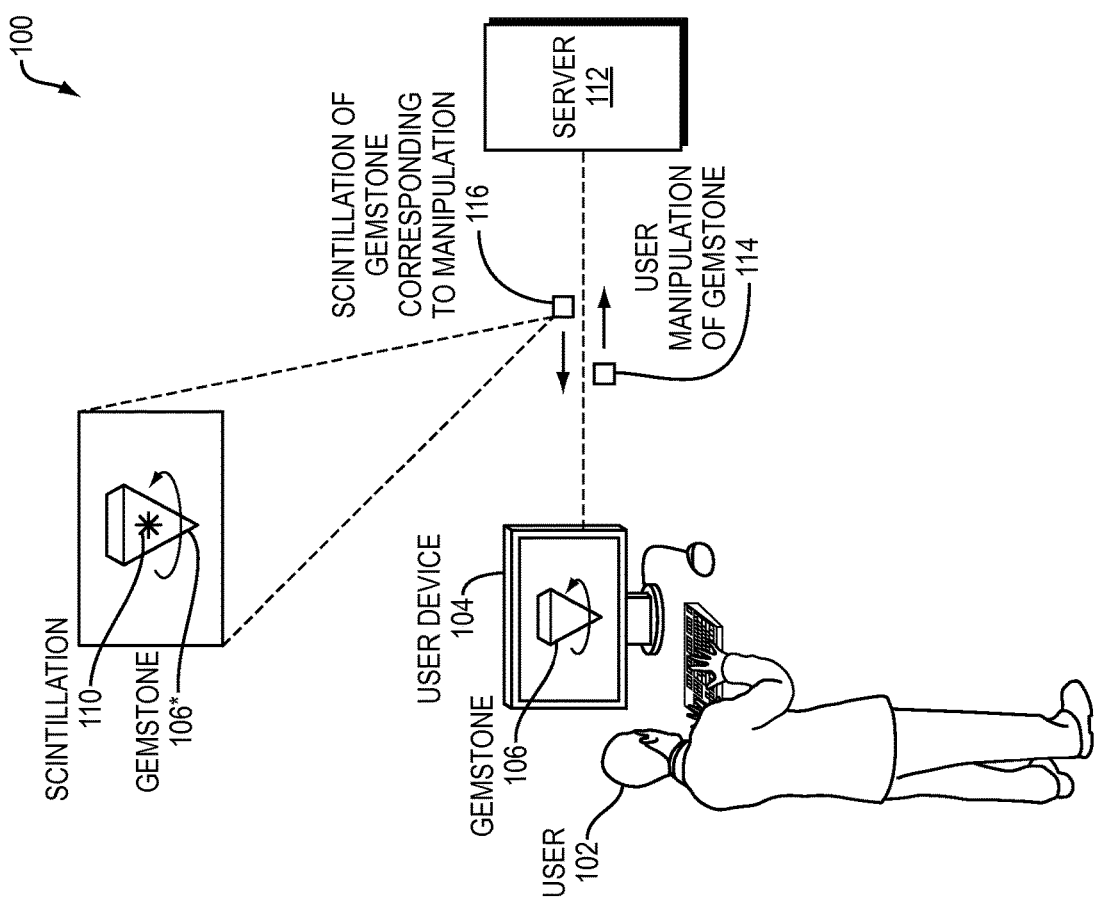
FIG. 1 is a block diagram illustrating an example embodiment of the present invention.

FIG. 1 is a block diagram 100 illustrating an exemplary embodiment of the present invention. A user 102 manipulates a 3D representation of the gemstone 106 displayed on a user device 104. The user manipulation of the gemstone 114 is sent to a Server 112. An application on the Server 112 determines the scintillations 116 on the 3D representation of the gemstone 106 based on the user manipulation 114 of the gemstone 106. The determined scintillations 116 are sent by the Server 112 to the user device 104. The determined scintillations 116 include a 3D representation of the gemstone 106*with scintillations 110 corresponding to the user manipulation 114 that are displayed on the user device 104.

A gemstone is divided into regions of flat surfaces called facets. The facets of the gemstone affect the behavior of light as it passes through from the outside of the gemstone surface into the interior of the gemstone. Light can be reflected off of the gem's exterior surface or the light can pass through the exterior surface of the gemstone and be refracted, scattered and dispersed as the light bounces off the interior surfaces before exiting the gemstone.

Gemstone illumination is the result of interactions between the light sources on the gemstone, the facets of the gemstone and the position of the customer viewing the gemstone. When a beam of light enters a gemstone, the beam is split and partitioned by the gemstone facets into multiple beams that are totally internally reflected and then refracted out of the stone. The refracted beams generate second and higher-order beams that are in turn, refracted out of the stone. Light exiting the gemstone may reach the eyes of an observer creating illumination effects that significantly impact the visual appearance of the gemstone.

Types of gemstone illumination include brilliance, sparkle and scintillation. Gemstone brilliance and sparkle is determined by factors such as the quality of the cut of the gemstone. A gemstone sparkles as light enters into the gemstone from the different facets, is reflected within the gemstone and is observable by the customer. The origin and formation of gemstone sparkle are described in the American Gems Society (AGS) Laboratory's *"Evaluation of brilliance, fire and scintillation in round brilliant gemstones"*, Sasian et al., 2007 (hereinafter "Sasian"), which is incorporated by reference in its entirety.

Scintillation is a flash of light, white or colored, that is produced when the gemstone, observer or the illumination source moves. Therefore, with respect to an embodiment of the present invention, gemstone scintillation is the result of relative motions between the light sources, the facets of the gemstone and the position of the customer viewing the gemstone. Each relative motion between the light sources also results in the illumination of different facets of the gemstone.

Fire scintillation and flash scintillation are two major scintillation effects. Flash scintillation is observable as sparkles of white light produced by the reflections of light sources on the gemstone. Fire scintillation is observable as segments of rainbow colors corresponding to the spectral separation of white light through the prismatic volume of the gemstone. Additionally, the arrangement of the multiple facets of a gemstone enhances the scintillation by producing a patterning effect.

Typical gemstone color grading schemes evaluate a gemstone's color by considering three components to evaluate a gemstone's "color": hue, saturation or intensity and tone. Hue is the unique or primary color of the gemstone, also described as the shade, tint or sensation of a color. While, all gemstones show shades of other colors, however, a gemstone that are considered more valuable show a pure color with only minimal hues of other colors. Color saturation or intensity of a gemstone is a measure of the intensity of the hue. Tone shows the depth of color of the gemstone. However, on brilliant gemstones, such as a diamond, a hue from a color of the prism appears to the observer on some of the virtual facets as the gemstone is manipulated. A similar effect can be created on a virtual representation of the gemstone.

An observer can visually perceive more facets than the actual number of cut facets because a beam of light entering a gemstone is divided into multiple beams resulting from the projection of the entering beam on the gemstone facets. These perceived facets are known as virtual facets and their number depends on the number of actual facets of the gemstone and on the number of times light is partitioned as it propagates through the gemstone.

A rendering engine according to the present invention simulates an in-store customer experience during online shopping by changing the intensity of the white light (flash scintillation) and the coloration of the light (fiery scintillation) on facets of the virtual representation of the gemstones as the user manipulates the jewelry.

To produce observable scintillation effects, the gemstone, the observer or the illumination conditions (e.g., light sources) should be in movement, relative to each other. When a piece of jewelry with gemstones is manipulated either online or in a store, the positions of the observer and the light source(s) are generally fixed. For maximum scintillation effects, the intensity of the light source(s) should be strong enough or above a particular threshold, to expose the brilliance or sparkle of the gemstones and the gemstones should have a high reflection index as a material. For the flash scintillation to be strong from the observer's viewpoint, the light source(s) should be positioned above the observer.

As the user manipulates jewelry with gemstones online, the rendering engine, according an embodiment of the present invention, represents flash scintillation by a change in the intensity of white color on the facets of the gemstones. Fiery scintillation is represented by change in the colors on the facets of the gemstones. As the piece of jewelry is rotated in one direction or the other, the colors representing fiery scintillations change according to the order of colors in the spectrum.

The flash and fiery scintillation effects of a single facet are defined by the values for lighting and extinction for that type of facet. Other relevant factors are the angle between the normal to the surface of the facet and the ray of incident light from a light source and the line of the eye of the observer. A facet has a maximum angle value for the white light or flash scintillation when the facet is directly in line with the eye of the observer. For the colored light or fiery scintillation, a facet's color can change from red to orange, to yellow, green and blue before becoming almost extinct of color, for example. The rendering engine according to the present invention controls the flash and fiery scintillations by adjusting the coloration of the light (mix between the white component and the colored component). The fiery color scale can be readjusted and compressed as needed to show different fiery scintillation effects with faster color extinction. Similarly, the white color can be enhanced by having a higher maximum flash scintillation.

Table 1, below, is an example of a look-up table of flash and fiery scintillation factors for various angles between incident light and the normal to the surface of a given facet on a round cut diamond with a Diamond refractive index of 2.419 and a Diamond critical refractive angle of 24.4 degrees. The extinction of the fiery scintillation for a given facet (virtual or real) can be found below −34 and above 34.

TABLE 1

| Angle in degrees between incident light and normal of the facet | Flash white | Fiery color |
|---|---|---|
| −90 | 0 | None |
| −80 | 2 | None |
| −70 | 2 | None |
| −65.6 (critical) | 2 | None |
| −34 | 3 | Blue |
| −33 | 4 | Green |
| −32 | 5 | Yellow |
| −31 | 6 | Orange |
| −30 | 7 | Red |
| −10 | 8 | None |
| 0 | 10 | None |
| 10 | 8 | None |
| 30 | 7 | Red |
| 31 | 6 | Orange |

TABLE 1-continued

| Angle in degrees between incident light and normal of the facet | Flash white | Fiery color |
|---|---|---|
| 32 | 5 | Yellow |
| 33 | 4 | Green |
| 34 | 3 | Blue |
| 65.6 (critical) | 2 | None |
| 70 | 2 | None |
| 80 | 2 | None |
| 90 | 0 | None |

The angle at which the light beam intersects with a given set of facets is the critical angle. At the critical angle, total internal reflection of the light beam is achieved. Table 1 shows that at angles having an absolute value higher than the critical angle, the direct refraction of the incident light disappears and the light is reflected. However, because of the transparency of the gemstone, some light that enters a facet through the other facets is internally reflected and illuminates that facet. For this reason, the value of the flash illumination above the critical angle is not zero.

The positions of the facets of the gemstone are fixed relative to one another and do not change as the gemstone is manipulated. Therefore, the angles between the normal to the surface of a given facet on the gemstone (as shown by Table 1, above) and the normal to the surface of another facet on the gemstone are also fixed. Therefore, a system can pre-compute an offset look-up table for a gemstone of a known material having a known type of cut. As the gemstone is manipulated, the values of the angles between the normal of each facet and the incident light can be used to immediately derive the scintillation values from the offset look-up table by adding the value of the angle between the incident light and the normal of the reference facet to the offset value for each facet of the gemstone. Once the normal of each facet is known, the values of the flash scintillation and the fiery scintillation for each facet are derived by applying a look-up table similar to the one shown in Table 1.

While not shown by Table 1, a look-up table can also include values indicating hue of a given facet based on the angle normal to that given facet. The hue in the look-up table is determined by factors such as the type of gemstone. The hue shown on each facet changes with the viewing angle normal to the facet, however, is less sensitive than the fiery scintillation. For example, the hue may change every ten degrees, where the fiery scintillation changes every one degree. Further, the hue shown on each facet is a subtle color.

Virtual facets can be simulated in real-time but require more computing power to partition the facets into virtual ones in order to assign different colors for fiery scintillation and light level for flash scintillation to the virtual facets. If the gemstone is presented having an orientation such that the table facet of the gemstone is facing the observer, the intensity levels of brilliance and fire can be defined for all the facets in terms of white and colors. A rotation of the gemstone in the plane of the table facet does not change the intensity level of brilliance and fire on the facets.

The rendering engine may also compute shadows in real-time. In this case, the background of the jewelry can be chosen appropriately to enhance the experience of manipulating the piece of jewelry. However, if shadows are not computed in real-time, the background should preferably be dark or black to contrast against the jewelry. The contrast simulates the velvet background, which is used to line many jewelry boxes and presenters in a store. The velvet background absorbs the light and, therefore, no shadows are cast by the jewelry.

An embodiment of the present invention applies to faceted gems that are transparent enough to have refraction and internal reflection. Non-faceted gems such as cabochons can use only environment mapping.

Therefore, an embodiment of the present invention employs a rendering engine to compute scintillation and shadows of gemstones in real time in response to customer manipulations of virtual gemstones.

Figure 2:
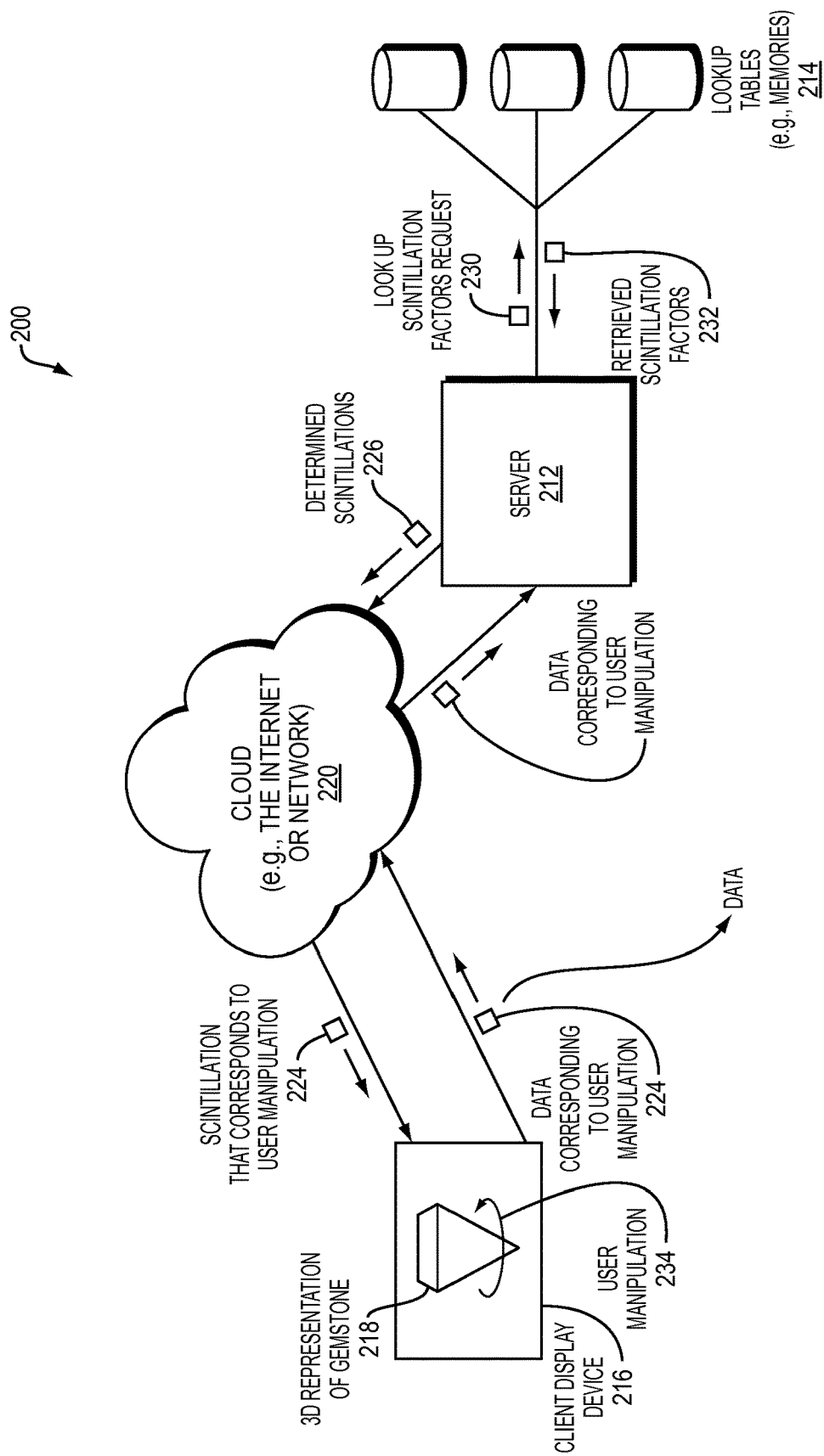
FIG. 2 is a block diagram of a system implemented according to an embodiment of the present invention.

FIG. 2 is a block diagram 200 of data flow in a system implemented according to certain embodiments of the present invention. A 3D representation of a gemstone 218 is displayed on a Client Display Device 216. A user manipulates the displayed 3D representation of the gemstone 218. Data 224 corresponding to the user manipulation of the gemstone is sent to a Server 212. The data 224 can be sent over a network 220. An application on the Server 212 determines at least one scintillation at multiple facets of the 3D representation of the gemstone by issuing a look-up scintillation factors request 230 to the look-up tables 214 and responsively, retrieving a scintillation factor 232, from the look-up tables 214 stored in a memory. The scintillation factor 232 corresponds to an angle of incidence of a light source to a facet or multiple facets of the gemstone. The application on Server 212 determines the scintillations 226 based on the retrieved scintillation factors 232. The determined scintillations 226 corresponding to the user manipulation are sent by the Server 212 to the Client Display Device 216. The determined scintillations 226 can be sent over network 220 to the Client Display Device 216. The determined scintillations can be sent by the Server 212 over a network 220.

The application determining at least one scintillation at multiple facets as well as the look-up tables 214 can also exist locally on a host computer and respective memories. In this case, it would not be necessary to send data 224 or receive data 226 and 222 over a network 220.

Figure 3A:
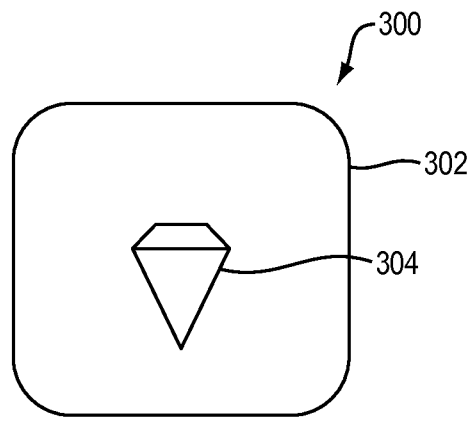
FIGS. 3A-C are diagrams illustrating user manipulation of a 3D representation of a gemstone according to an embodiment of the present invention.
Figure 3B:
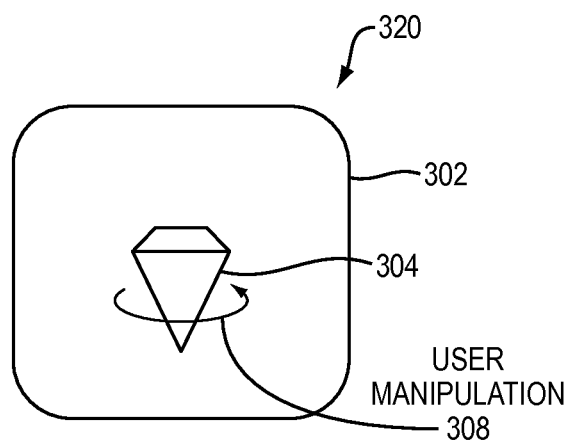
Figure 3C:
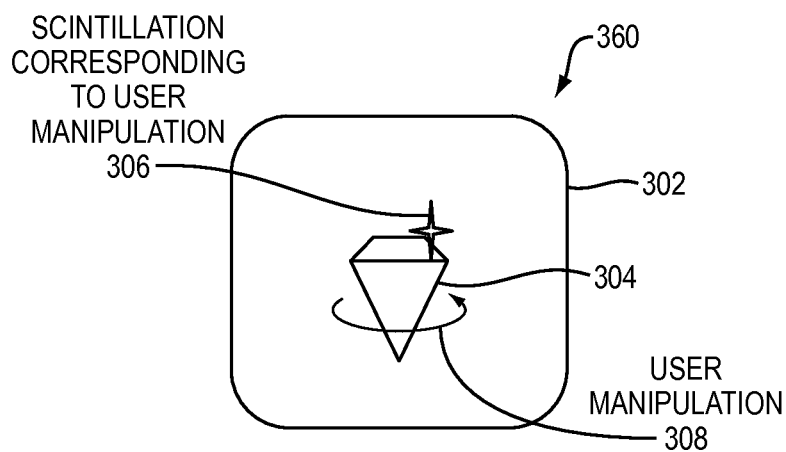

FIGS. 3A-3C are diagrams 300, 320 and 360, respectively, illustrating the user manipulation of a 3D representation of a gemstone 304 according to an embodiment of the present invention.

In FIG. 3A, diagram 300 illustrates a 3D representation of a gemstone 304 displayed on a display device 302.

FIG. 3B is a diagram 320 illustrating the displayed 3D representation of the gemstone 304 manipulated by user rotation 308 (though not shown in 3B, only in 3C). The rendering engine according to the present invention determines, in real-time, the scintillation corresponding to the user manipulation.

FIG. 3C is a diagram 360 illustrating a display device 302 showing the determined scintillation 306 on the 3D representation of the gemstone 304.

Figure 4:
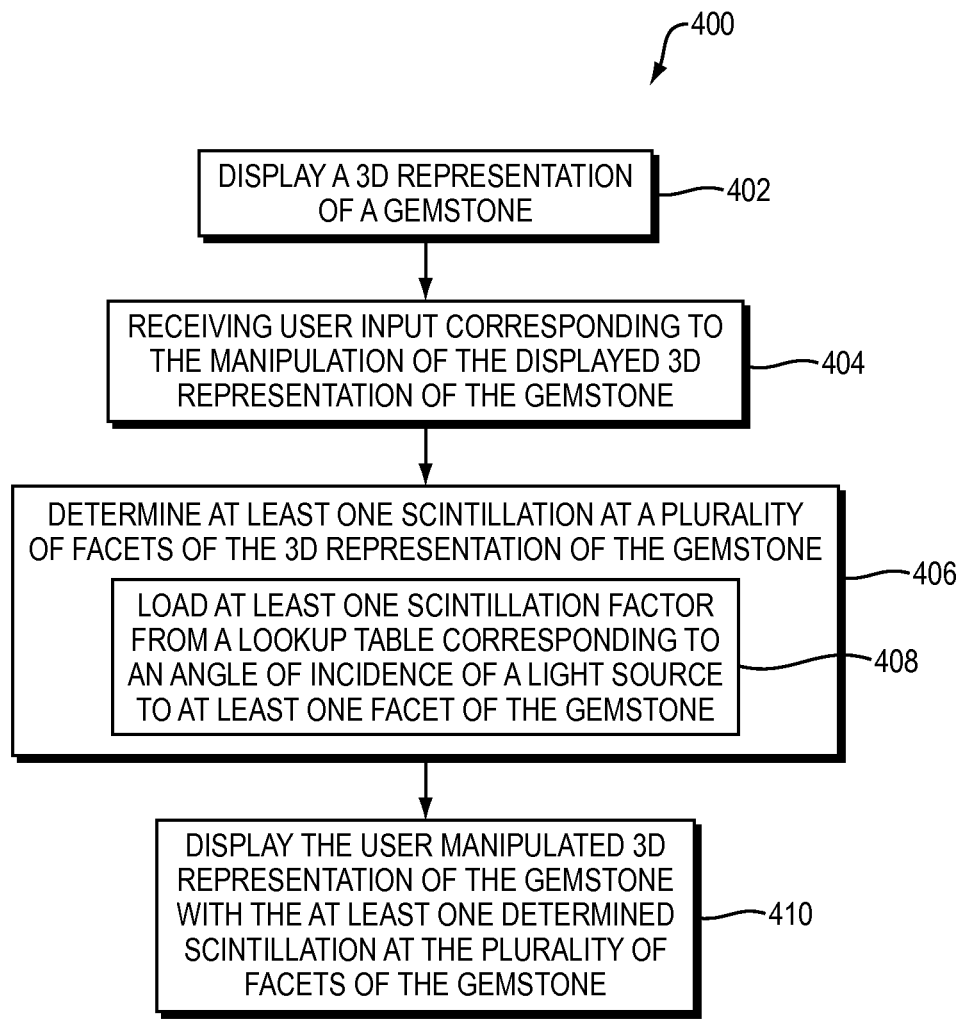
FIG. 4 is a flow diagram illustrating a process employed by an embodiment of the present invention.

FIG. 4 is a flow diagram 400 of a method employed by an example embodiment of the present invention. A 3D representation of a gemstone is displayed to user 402. In response to receiving user input corresponding to the manipulation of the displayed 3D representation of the gemstone 404, at least one scintillation at a plurality of facets of the 3D representation of the gemstone is determined 406. The scintillation is determined by loading at least one scintillation factor from a look-up table corresponding to an angle of incidence of a light source to at least one facet of the gemstone 408. Then, the at least one determined scintillation at a plurality of facets of the gemstone is displayed for the user in real-time 410.

Figure 5:
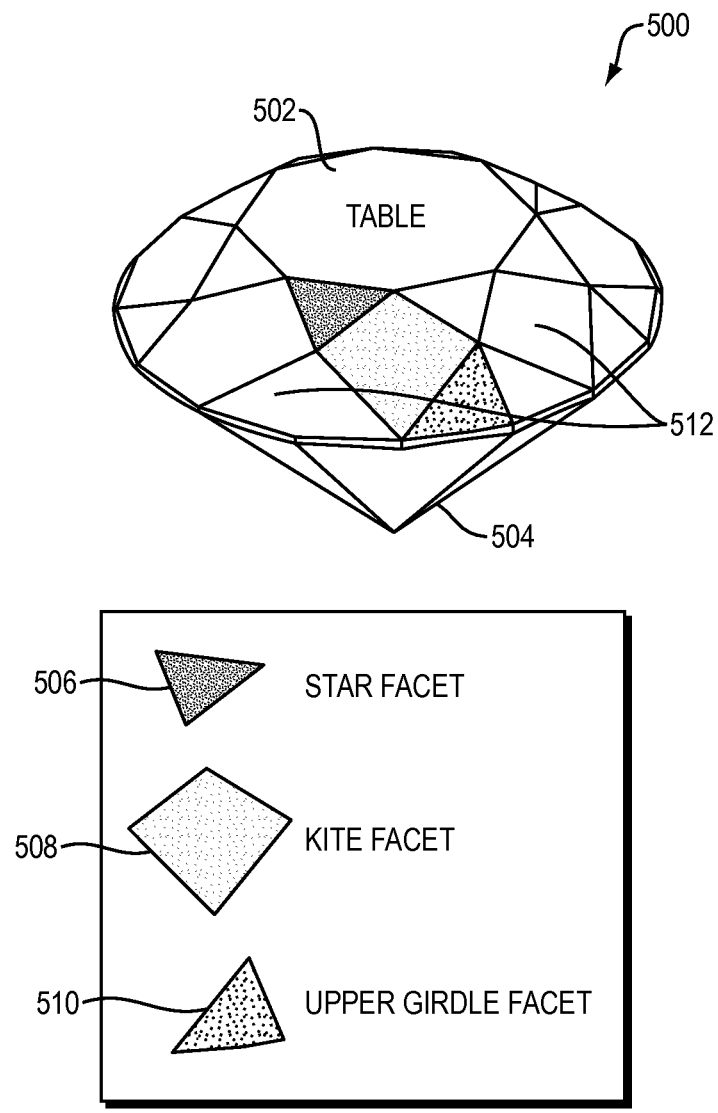
FIG. 5 is a diagram illustrating types of facets of an example of a cut gemstone.

FIG. 5 is a diagram 500 illustrating types of facets of an example of a cut gemstone. The facets 502, 512 on the top of the gemstone form the crown of the gemstone and the facets 504 at the bottom of the gemstone form the pavilion of the gemstone. The crown is further divided into the table facet 502 and the bezel 512. The bezel 512 contains eight star facets 506, eight kite facets 508 and sixteen upper girdle facets 510. Facets in the crown capture light and facets in the pavilion reflect light by total internal reflection. This light capturing and redirection makes a gem appear illuminated. The produced illumination effects make the gemstone visually appealing. Referring again to FIG. 5, a standard round cut gemstone has one table facet 502, eight star facets 506, eight kite facets 508 and sixteen upper girdle facets 510. However, a standard round cut gemstone has four apparent or visible facets: a table facet 502, a star facet 506, a kite facet 508 and an upper girdle facet 510. The lower facets are barely visible or not visible at all. Facets that are not visible do not have to be rendered by the present system, saving valuable processor resources.

Figure 6:
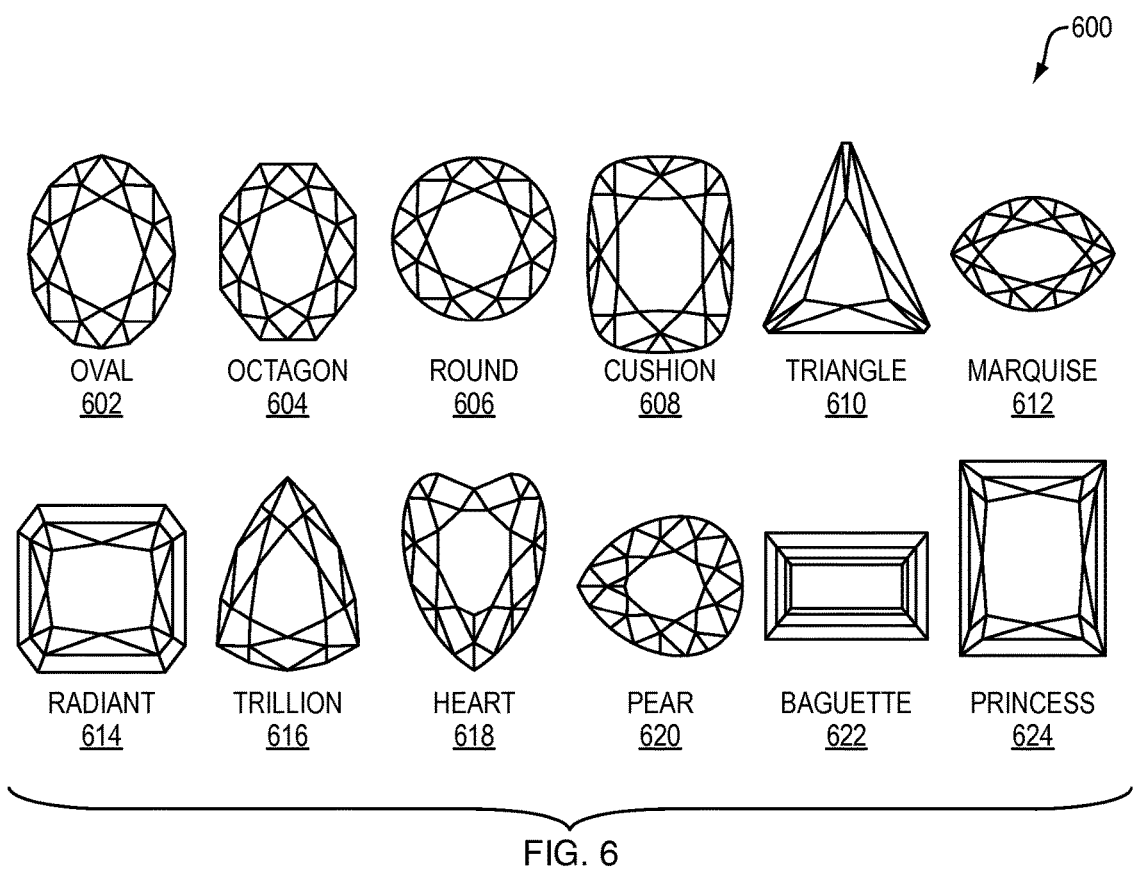
FIG. 6 is a diagram illustrating examples of a plurality of types of gemstone cuts.

FIG. 6 is a diagram illustrating examples of a plurality of gemstone cuts 602-624. The gemstone cuts 602-624 include a round cut 602, an octagon cut 604, an oval cut 606, a cushion cut 608, a triangle cut 610, a marquise cut 612, a radiant cut 614, a trillion cut 616, a heart cut 618, a pear cut 620, a baguette cut 622, and a princess cut 624. Each gemstone cut 602-624 is shaped differently as a gemstone. In addition, each gemstone cut 602-624 comprises relatively different shaped and angled facets and virtual facets that refract and reflect light differently. As such, a person of ordinary skill in the art can recognize that each gemstone cut 602-624 corresponds to at least one different look-up table to calculate scintillation and sparkle. A person of ordinary skill in the art can generate look-up tables in accordance with the properties of each corresponding the gemstone cuts 602-624

Figure 7:
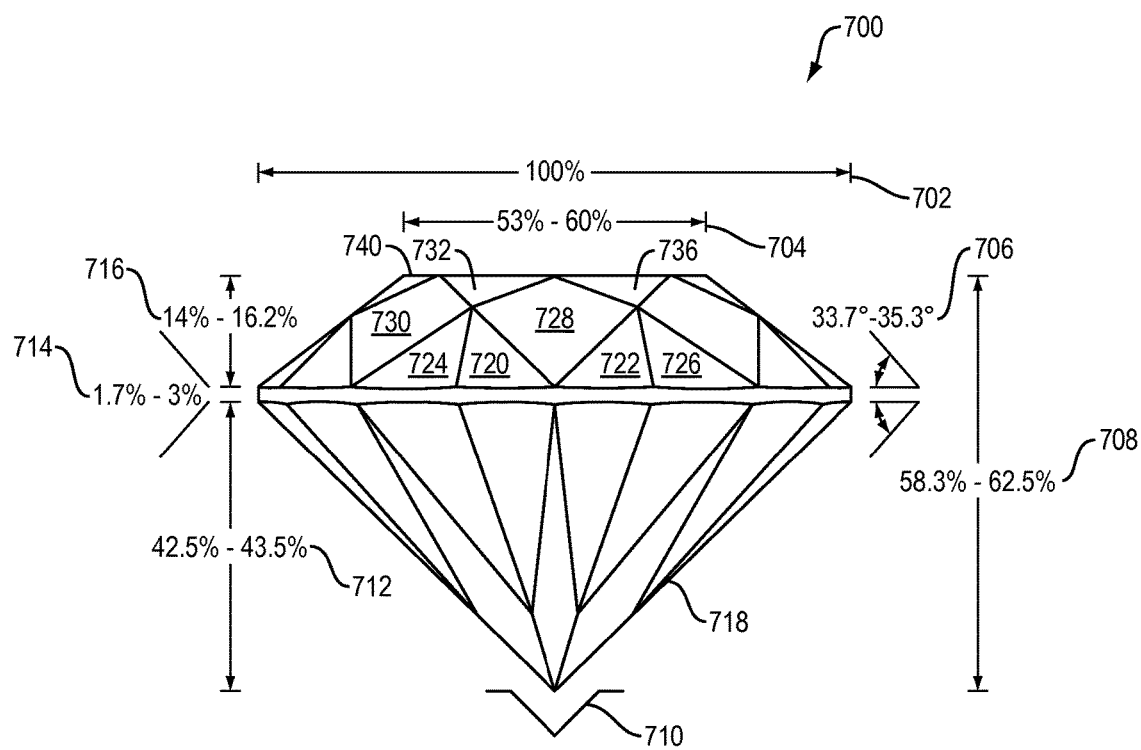
FIG. 7 is a diagram illustrating of the periodicity of reflections for a standard round cut gemstone.

FIG. 7 is a diagram 700 illustrating the periodicity of the reflections calculated for a standard round cut gemstone as it is manipulated. A round cut gemstone 718 can be presented in a first position. In this first position, the facets to note are the front facing upper girdle facet 720, the next upper girdle facet 722, the left 724 and right upper girdle facets 726. A horizontal circular movement of the gemstone of 360/16 or 22.5 degrees corresponds to a rotation of the gemstone into a second position in which the next upper girdle facet 722 is realigned approximately to the same orientation as the front facing upper girdle facet's 720 orientation prior to rotation. However, after the rotation, the orientation of the left 724 and right 726 upper girdle facets differs. A horizontal circular movement of the gemstone of 360/8 or 45 degrees realigns the kite facet 728 to the next kite facet 730 and realigns the star facets (732, 736) to the next star facets as well. The crown angle 406 is approximately 34 (33.7) degrees, so that a rotation in the vertical plane approximately positions the table facet 740 at the upper girdle, kite and star facets. In this example, the periodicity of the reflections in the three axes are 22.5 degrees and 45 degrees in the rotation around a vertical axis, and 34 degrees in the rotations around the two horizontal axes of the table facet 740. The periodicity may be used to simplify the computations. This is also useful when several gems of the same type are used on the same piece of jewelry.

The type of cut of the gemstone can be used to define the model of the facets, in particular above the girdle. Virtual facets of a facet can also be defined for each type of cut. Each facet or each virtual facet defined by the decomposition of a real facet into virtual facets is associated with the normal to its surface (real or virtual). All the normals originating at the center of the gemstone are characteristic of the cut of the gemstone and independent of the dimensions of the gemstone. Therefore, the normals for a type of gemstone can be pre-computed for each type of cut.

The model of the facets and virtual facets above the girdle can be simplified as the gem becomes smaller. The value of the color for real and virtual facet is read from a pre-defined look-up table. Based on the observation of real gemstones, the illumination and extinction of scintillation occurs in a fraction of angle (e.g. a degree or a few degrees) and seems to appear in a unique fashion because it depends on the quality of each real stone's cut. The same effect can be created by inserting fiery and flash scintillations into the look-up table among darker values in order to increase the contrast. Alternatively or in conjunction, small alpha map textures can be inserted to be displayed at these points during a fraction of an angle (for example, one fiery red, one yellow, one yellow and one green).

The example in Table 1 is for a standard round cut brilliant gemstone. However, look-up tables of scintillation factors can be pre-computed for gemstones with other types of cuts, such as octagon, oval, cushion, heart, others known to a person of ordinary skill in the art or as shown above in relation to FIG. 6. Scintillation factors can also be pre-computed for gemstones of a variety of materials provided that the level of transparency of the material is high enough. Similarly, a higher refraction index of the gemstone generates stronger scintillations.

Figure 8:
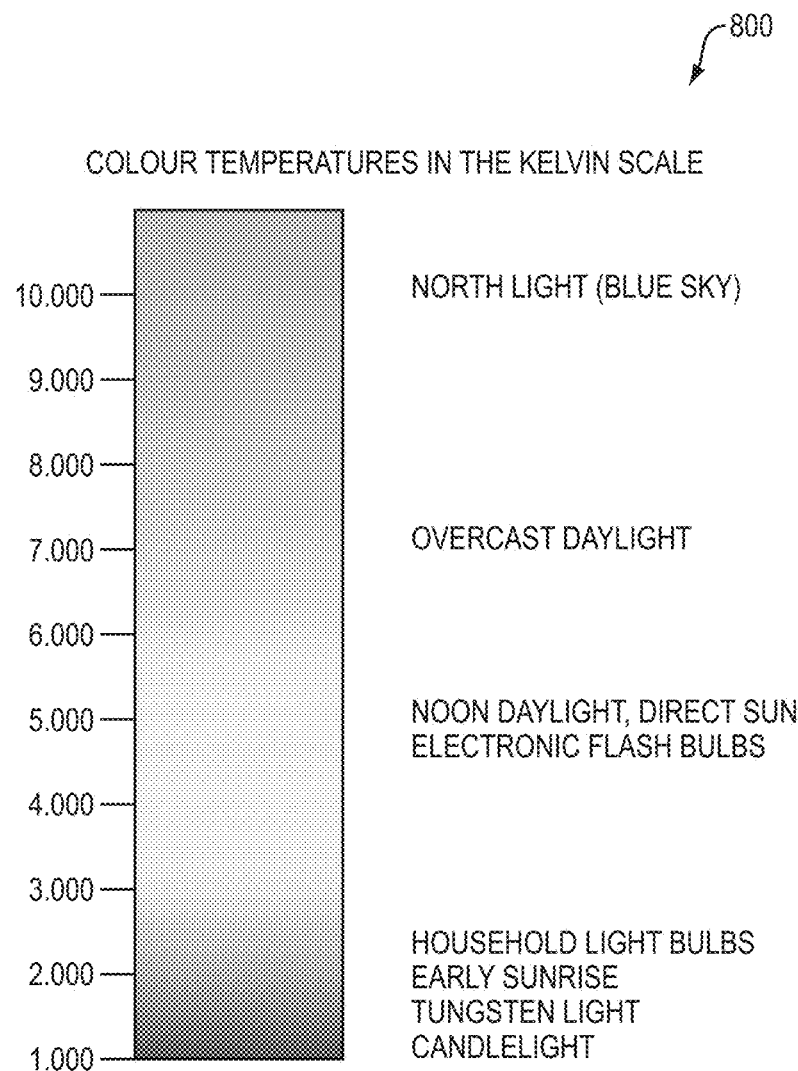
FIG. 8 is a diagram illustrating a light scale of color and illumination as perceived in the physical world.

FIG. 8 is a diagram 800 illustrating a light scale of color and illumination as perceived in the physical world. In the physical world, the color and type of illumination of the light source, such as fluorescent lighting can change the perceived appearance of a gemstone. FIG. 8 shows the temperature of the light in Kelvin degrees. The appearance of a sapphire, for example, is enhanced under a deep blue sky light at 10,000 Kelvin while a ruby has a better appearance at the lower end of the scale in orange-red at 1000 Kelvin. Similarly, in a virtual environment, the light source may also be colored to improve the perceived appearance of the gemstone for the viewer. Therefore, the color of the light source may be an additional variable used by the rendering engine to enhance the customer experience of viewing jewelry containing gemstone(s).

Figure 9:
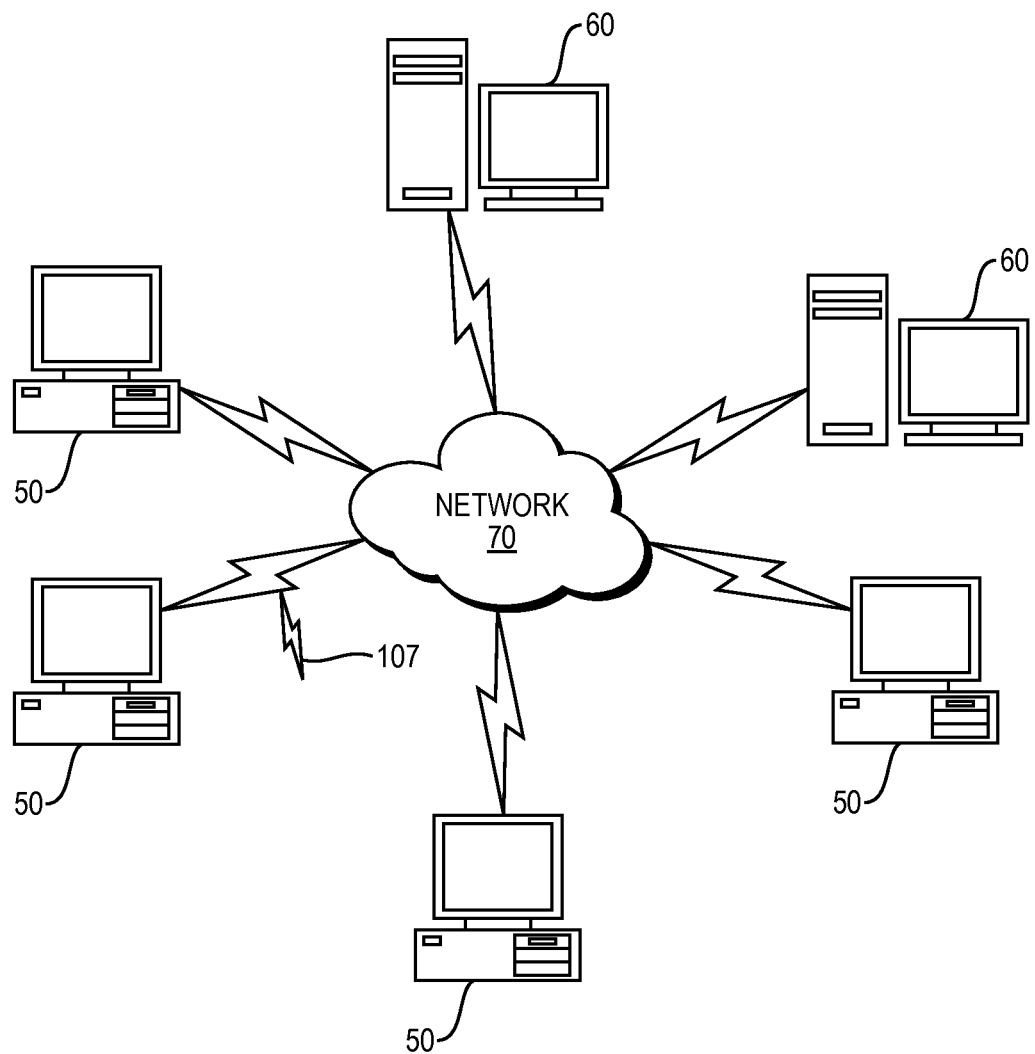
FIG. 9 is a diagram illustrating a computer network or similar digital processing environment in which the present invention may be implemented.

FIG. 9 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
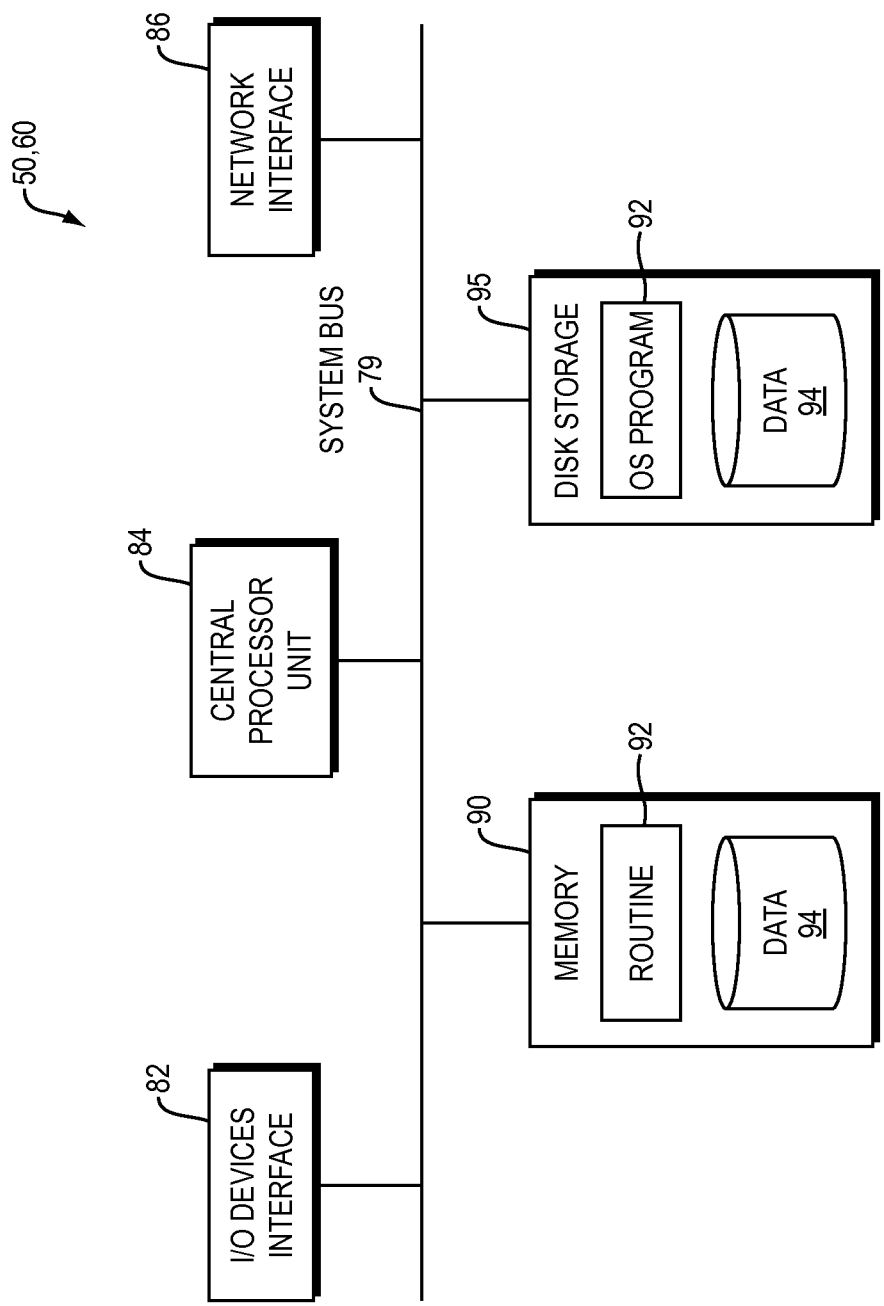
FIG. 10 is a diagram of the internal structure of a computer in a computer system.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., rendering engine code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for rendering a real-time view of a reflective and refractive (RAR) object, the method comprising:
   in response to user input rotations from a user, rotating a three-dimensional (3D) representation of the RAR object in three-dimensions;
   for each rotated position of the RAR object:
   determining at least one scintillation factor to be displayed at a plurality of facets of the 3D representation of the rotated RAR by loading, from a look-up table corresponding to the RAR object rotated by the user, the look-up table configured for a particular material composing the RAR object and a cut of the RAR object, the look-up table stored in memory, at least one scintillation factor corresponding to one of two or more fields in the look-up table of an angle of incidence of a light source to at least one facet of the RAR object; and
   displaying to a user via a display, the 3D representation of the rotated RAR object with the at least one determined scintillation factor rendered on the plurality of facets of the RAR object.

2. The computer-implemented method of claim 1, wherein determining the at least one scintillation factor includes dividing each facet of the 3D representation of the RAR object into a plurality of virtual facets.

3. The computer-implemented method of claim 1, wherein determining the at least one scintillation factor includes determining the fiery scintillation and/or the flash scintillation.

4. The computer-implemented method of claim 1, wherein the scintillation factor is a flash scintillation if the RAR object is colored.

5. The computer-implemented method of claim 1, wherein determining the at least one scintillation factor is based on a position and properties of a light source.

6. The computer-implemented method of claim 1, wherein the position of the light source is above the user.

7. The computer-implemented method of claim 1, wherein determining the at least one scintillation factor is based on a plurality of look-up tables for a RAR object.

8. The computer-implemented method of claim 1, wherein the 3D representation includes a plurality of RAR objects.

9. The computer-implemented method of claim 1, wherein determining the at least one look-up table corresponding to at least one scintillation factor is based on at least one of dispersion, cut angle of the facet, lighting or refractive index.

10. The computer-implemented method of claim 1, wherein the displaying of the 3D representation of the RAR object having been user manipulated includes displaying a change in the intensity of the white light on at least one facet of the RAR object.

11. The computer-implemented method of claim 1, wherein the displaying of the 3D representation of the RAR object having been user manipulated includes displaying a change in the coloration of the light on at least one facet of the RAR object.

12. The computer-implemented method of claim 1, wherein the RAR object is a gemstone.

13. A computer system for rendering a real-time view of a reflective and refractive (RAR) object comprising:
one or more processors configured to manipulate and display a 3D representation of the RAR object in response to user input rotations from a user;
for each rotated position of the RAR object:
determining at least one scintillation factor to be displayed at a plurality of facets of the 3D representation of the rotated RAR by loading, from a look-up table corresponding to the RAR object rotated by the user, the look-up table configured for a particular material composing the RAR object and a cut of the RAR object, the look-up table stored in memory, at least one scintillation factor corresponding to one of two or more fields in the look-up table of an angle of incidence of a light source to at least one facet of the RAR object; and
displaying to a user via a display, the 3D representation of the rotated RAR object with the at least one determined scintillation factor rendered on the plurality of facets of the RAR object.

14. The computer system of claim 13, wherein determining the at least one scintillation factor includes dividing each facet of the 3D representation of the RAR object into a plurality of virtual facets.

15. The computer system of claim 13, wherein determining the at least one scintillation factor includes determining the fiery scintillation and/or the flash scintillation.

16. The computer system of claim 13, wherein the scintillation factor is a flash scintillation if the RAR object is colored.

17. The computer system of claim 13, wherein determining at least one scintillation factor is based on a position and properties of a light source.

18. The computer system of claim 13, wherein the position of the light source is above the user.

19. The computer system of claim 13, wherein determining the at least one scintillation factor is based on a plurality of look-up tables for a RAR object.

20. The computer system of claim 13, wherein the 3D representation includes a plurality of RAR objects.

21. The computer system of claim 13, wherein determining the at least one look-up table corresponding to at least one scintillation factor is based on at least one of dispersion, cut angle of the facet, lighting or refractive index.

22. The computer system of claim 13, wherein the displaying of the 3D representation of the RAR object having been user manipulated includes displaying a change in the intensity of the white light on at least one facet of the RAR object.

23. The computer system of claim 13, wherein the displaying of the 3D representation of the RAR object having been user manipulated includes displaying a change in the coloration of the light on at least one facet of the RAR object.

24. The computer system of claim 13, wherein the RAR object is a gemstone.

* * * * *